United States Patent [19]

Adams

[11] 4,228,699
[45] Oct. 21, 1980

[54] GEAR ASSEMBLIES AND TRANSMISSION

[75] Inventor: Frederick J. Adams, Clevedon, England

[73] Assignee: Cam Gears Limited, Hertfordshire, England

[21] Appl. No.: 22,635

[22] Filed: Mar. 21, 1979

[30] Foreign Application Priority Data

Mar. 22, 1978 [GB] United Kingdom ............... 11384/78

[51] Int. Cl.$^3$ ............................................. B60K 41/04
[52] U.S. Cl. ............................................. 74/853
[58] Field of Search ................. 74/190, 191, 192, 193, 74/194, 195, 196, 197, 198, 199, 200, 201, 853

[56] References Cited

U.S. PATENT DOCUMENTS

| | | | |
|---|---|---|---|
| 2,349,147 | 5/1944 | Dunn | 74/853 |
| 2,380,717 | 7/1945 | Beltz | 74/853 |
| 2,796,059 | 6/1957 | Long | 74/853 |

Primary Examiner—Patrick D. Lawson

[57] ABSTRACT

A variable ratio gear assembly and transmission system. A rotor (10) carried by a piston and cylinder device (13, 15) engages a drive face (9) on a rotatable input shaft (3) and also engages a drive face (27) on a rotatable disc (28). Rotation of the shaft (3) imparts traction or fluid film drive to the rotor (10) which latter imparts traction or fluid film drive to the disc (28). Variation in the ratio of the gear is effected by actuation of the piston and cylinder device (13, 15) to displace the rotor (10) over the drive faces (9) and (27) while maintaining engagement therewith. A further rotor (33) carried by a piston and cylinder device (36, 38) drivingly engages by traction or fluid film drive with opposed drive faces (32 and 43) respectively carried by the disc 28 and an output shaft (45). Displacement of the rotor (33) by actuation of the device (36, 38) varies or further varies the gear ratio.

The drive face (9) is urged into engagement with the rotor (10) by a pin and slot device (7) which is responsive to the rotation of shaft (3). The piston and cylinder device (13, 15) (and possibly 36, 38) is pivotally mounted at (26) to the housing (1) so that it can be pivoted and urged into closer engagement with the drive face (27) upon axial displacement of the drive face (9) towards the face (27).

Mounted in the drive face (9) is a freely rotatable rotor (50) having a non-driving region (49) which when engaged by the rotor (10) does not transmit drive from the shaft (3) to the rotor (10). Rods (25 and 42) permit manual adjustment of the piston and cylinder devices. The output shaft (45) may be displaceable axially to move its drive face (43) into or out of engagement with the rotor (33).

34 Claims, 7 Drawing Figures

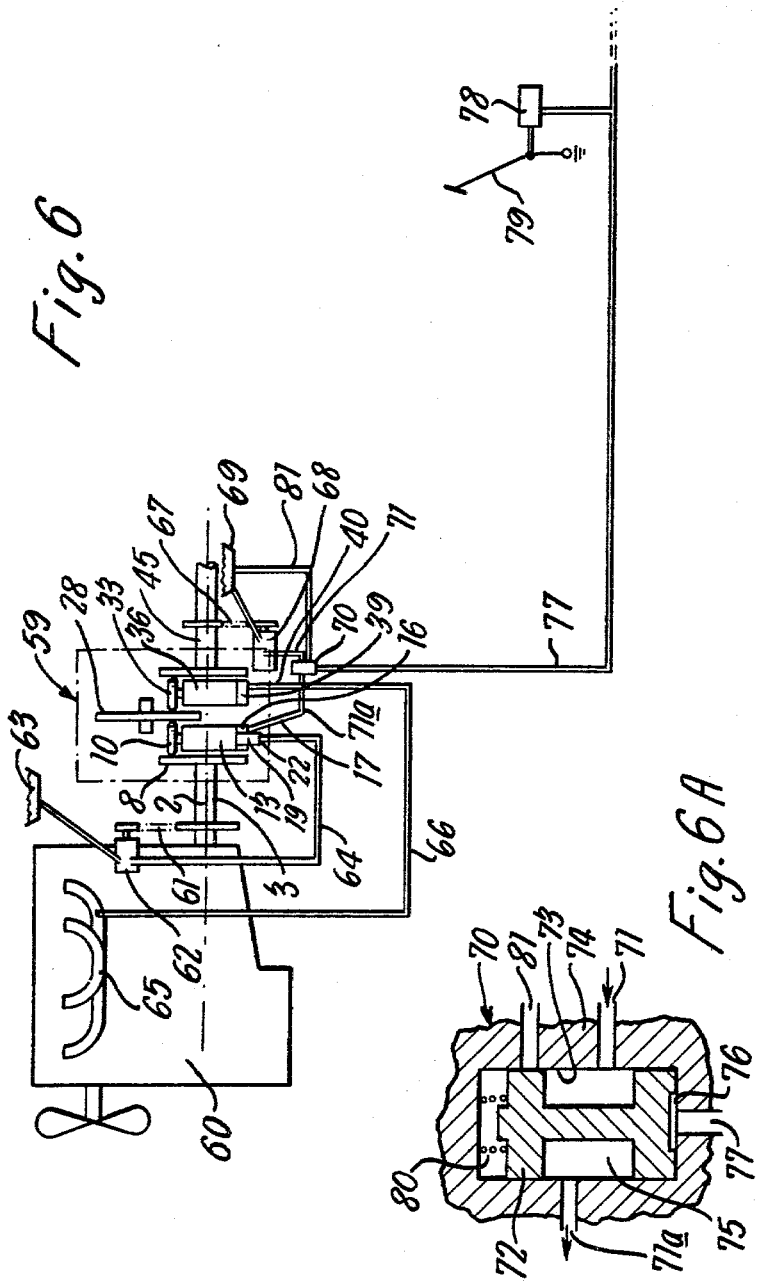

4,228,699

GEAR ASSEMBLIES AND TRANSMISSION

TECHNICAL FIELD

This invention relates to a gear assembly and is particularly concerned with an assembly which provides a variable ratio between a rotatable input and a rotatable output and has particular application to use with traction drives and with the so-called oil film drives. The invention is also concerned with a transmission system which incorporates the gear assembly.

STATEMENT OF INVENTION AND ADVANTAGES

In its broadest aspect the invention relates to a variable ratio gear assembly comprising a first member having a first axis about which the first member is intended to be rotatably driven, said member having a drive face which extends laterally relative to said first axis;

a second member having a second axis which extends laterally relative to the first axis and about which second axis the second member is intended to be rotatably driven, said second member engaging, or being capable of engaging, said drive face so that, when one of said members is rotatably driven about its axis, rotation is imparted to the other member by oil film or traction drive; and control means for displacing the first and second members relative to each other and substantially in the direction of the second axis while the second member is maintained in engagement with the drive face to vary the ratio of drive which is transmitted between said members.

The gear or speed ratio which is transmitted between the first and second members during rotation of one of these members will vary in accordance with variations in the radial distance in the position of engagement (between the second member and the drive face) relative to the first axis. Consequently by adjustment of the control means to displace relatively the first and second members to each other in the direction of the second axis, the ratio, which is transmitted through the gear assembly, will change. Usually the second member will be displaced radially relative to the axis of the first member so that changes in gear ratio will be made in accordance with the changes in the diameter of the effective contact circle between the drive face and the second member.

In a preferred embodiment the control means displaces the second member relative to the first member. In such an arrangement the second member can engage, or be capable of engaging, a second drive face of a third member, said third member having a third axis about which it is intended to be rotatably driven and which extends laterally relative to the second axis and said second drive face extends laterally relative to the third axis so that when one of the second and third members is rotatably driven about its axis rotation is imparted to the other of those members by oil film or traction drive, and wherein upon displacement of the second member by the control means the second member is maintained in engagement with both the first drive face (that is the drive face of the first member) and the second drive face to vary the ratio which is transmitted between the first and third members. Preferably the first and third axes are substantially parallel. It is also preferred that the first, second and third axes are stationary relative to each other and that the second member is displaceable along its axis and relative to the first and third members.

The gear assembly can further comprise a fourth member having a fourth axis which extends laterally relative to the third axis and about which fourth axis the fourth member is intended to be rotatably driven, said fourth member engaging, or being capable of engaging, the second drive face or a third drive face of the third member which drive face extends laterally relative to the third axis so that when one of said third and fourth members is rotatably driven about its axis rotation is imparted to the other of said members by oil film or traction drive, and second control means for displacing the third and fourth members relative to each other and substantially in the direction of the fourth axis while the fourth member is maintained in engagement with the said second or third drive face of the third member to vary the ratio of drive which is transmitted between the third and fourth members and thereby, by operation of the first control means associated with the second member and the second control means to vary the ratio of drive which is transmitted between the first and fourth members.

Conveniently the second and fourth axes are substantially parallel but preferably the second and fourth axes is in substantially parallel planes. It is preferred that the third member is located between the second and fourth members and that the fourth member engages with a third drive face of the third member which third drive face is directed outwardly along the axis of the third member and in the axially opposite direction (that is along the third axis) to that of the second drive face.

The invention can still further comprise a fifth member having a fifth axis about which it is intended to be rotatably driven and which fifth axis extends laterally relative to the fourth axis, said fifth member having a fourth drive face which extends laterally relative to said fifth axis, the fourth member engaging, or being capable of engaging by oil film or traction drive, the fourth drive face so that when one of said fourth and fifth members is rotatably driven about its axis rotation is imparted to the other of those members, and wherein the second control means displaces the fourth member laterally relative to the fifth axis while the fourth member is maintained in engagement with the fourth drive face to vary the drive ratio which is transmitted between said fourth and fifth members and thereby, by operation of the first and second control means to vary the drive ratio which is transmitted between the first and fifth members.

Preferably the first, third and fifth axes are substantially parallel and conveniently the first axis is in alignment with the fifth axis. It is also preferred that the second axis extends substantially radially of the first axis and the fourth axis extends substantially radially of the fifth axis.

In a simple form the gear assembly can comprise the first and second rotatable members and the first control means for varying the ratio of rotatable drive which is transmitted between these two members. It is envisaged however that the gear assembly will more usually include the first to the fifth members rotatably mounted for rotation about their respective axes and the first and second control means for the second and fourth members respectively, all such members and control means being located in a common housing with, say, the first member being intended to be rotatably driven by the output from an engine and the fifth member being intended to provide a rotational output for the coupling to an appropriate part or system which is to be driven. In such an arrangement oil film or traction drive will be transmitted sequentially from the first member, through the second, third and fourth members to the fifth member and the ratio of the gear which is transmitted from the input to the output will be dependent upon the positioning of the engagement between the second member with the drive faces of the first and third members and relative to the first and third axes and of the positioning of the fourth member with the drive faces of the third and fifth members and relative to the third and fifth axes, such positioning of the second and fourth members being determined by the first and second control means respectively to provide, within predetermined limits, an infinitely variable ratio gear or transmission assembly. An advantageous feature of the assembly is the facility which it affords to step-up or step-down the gear ratio, say, from a 1:1 ratio by appropriately adjusting the first and second control means to change the respective positions, relative to the third axis, at which the second and fourth members engage with the drive face or faces of the third member. By this arrangement of the second, third and fourth members, if the second member is engaging with the drive face of the third member at a greater radius relative to the third axis than the radius at which the driven fourth member engages with the appropriate drive face of the third member then there will be a speed ratio decrease (that is a ratio less than one) in transmission of drive from the second member to the fourth member through the third member so providing a high mechanical advantage (greater than one); if one or other (or both) of the first and second control means is now operated to displace the second and/or the fourth member so that the fourth member engages with the appropriate drive face of the third member at a greater radius relative to the third axis than that at which the second member engages with the drive face of the third member then the gear ratio will vary progressively through a 1:1 ratio to a speed ratio increase (that is a ratio greater than one) in transmission of drive from the second member to the fourth member through the third member so providing a decreased mechanical advantage (less than one).

As the engagement of the second and/or fourth members with their respectively associated drive faces is by oil film or traction drive it is preferred that the drive faces are substantially flat and extend substantially perpendicularly relative to the axis about which they are rotatable. Conveniently the first and fifth members comprise input and output shafts respectively each of which has a flange at one end thereof, the first drive face being located on the end face of the input shaft on the flange thereof and the fourth drive face being located on the end face of the output shaft on the flange thereof. The third member is conveniently in the form of a disc which is rotatably mounted in the gear housing and has opposed flat side faces which are substantially parallel and extend perpendicularly to the third axis, one of these side faces providing the second drive face and the other providing the third drive face.

The second and fourth members are preferably rotatably mounted on components which are displaceable along the second and fourth axes respectively and displacement of which components is respectively controlled by operation of the first and second control means.

To maintain effective driving engagement between the respective members biasing means can be provided for urging two or more of such members into engagement along the appropriate axes; such biasing means is particularly desirable since drive between the respectively engaging members is achieved by the transmission of traction through an oil film which separates the faces of, those members. In a simple construction of the gear assembly formed by the first and second members the biasing means can be arranged to displace the first member in the direction of its axis and into engagement with the second member. Such biasing means can also be used in a more complex gear assembly having the first to the fifth members in which the first, third and fifth axes are substantially parallel to cause the respectively engaging members to be urged into more effective engagement. In a preferred embodiment the biasing means is responsive to the speed of rotation of one of the members and can be in the form of a cam device actuated by a driven or driving member whereby as that member is rotatably driven it is displaced by the cam device along its axis to progressively urge that member into closer engagement with the drive face or the other member with which it co-operates. For example, the biasing means can be associated with the first member which is intended to be rotatably driven by an input to the gear assembly so that when the first member is rotated the biasing means causes that member to be displaced along the first axis into more effective engagement with the second member. The cam device can, for example, be in the form of a pin and slot arrangement or a ball and cam surface arrangement incorporated between two relatively rotatable components in the member whereby as one of those components is rotatably driven a reaction is imparted to the pin and slot or ball and cam surface arrangement to impart axial displacement between those two components and thereby provide appropriate biasing.

In an arrangement of the first, second and third members when the first and second drive faces are located oppositely to each other (for example with the first and third axes substantially parallel) and biasing means is provided on the first member for urging the drive face of that member into engagement with the second member, the second member can be pivotally mounted in a housing of the assembly so that the second member will be pivoted by the biasing force exerted thereon from the first member and urged into closer engagement with the second drive face of the third member. If required, the fourth member can similarly be pivotally mounted in the housing for movement into close driving engagement with the appropriate drive face of the third member and the fourth drive face of the fifth member. In a more complex arrangement of the assembly which includes the aforementioned five members of which the fourth member is pivotally mounted, pivotal movement of the fourth member can result from a biasing force exerted thereon which is exerted through the third member by pivotal movement of the second member (as previously mentioned) and/or by a biasing force exerted thereon from the fifth member to urge the fourth member into close driving engagement with the third and fifth members. If required, the fifth member can be displaceably mounted for movement in the direction of its axis for example into and out of driving engagement with the fourth member so that by appropriate axial displacement of the fifth member a smooth take-up can be provided for the output of the gear and also such axial displacement can be used to provide appropriate biasing to urge, for example, the third, fourth and fifth members into driving engagement.

The drive face of the first member (and/or one or more of the other drive faces) can have associated therewith a non-driving region which, when such non-driving region is engaged by the second member (or the fourth member as the case may be) does not permit drive to be transmitted from the drive face to the member in engagement with the non-driving region associated with that drive face. Therefore transmission is only effected upon relative displacement of the member out of engagement with the non-driving region and into engagement with the drive face. Conveniently the non-driving region is located on a part carried by the first member (or the third or fifth members as the case may be) and which is freely rotatable relative to the drive face of that member.

Usually the second member (and/or the fourth member) will be biased in the direction of the second axis (or the fourth axis as the case may be) to a predetermined position so that operation of the first control means (or the second control means as the case may be) causes the second member (or the fourth member) to be displaced against said biasing. For example the second member can be biased to a position in which it normally engages a non-driving region associated with the first drive face so that there will be no transmission through the assembly. In a preferred embodiment a non-driving region is located on the first axis and is carried by a freely rotatable rotor mounted on the first member within the first drive face so that when the second member engages with that non-driving region there is no transmission through the assembly but upon actuation of the first control means the second member can be displaced laterally relative to the first axis so that, with the first member rotating at constant angular velocity, the speed of rotation of the second member progressively increases as that second member is displaced radially further from the first axis.

The assembly can be arranged for transmission of drive in forward and reverse senses. This facility can be achieved by ensuring that, when the or one of the drive faces is intended to be rotated in one sense of direction, the second or fourth member which engages with that drive face can be displaced by its associated control means (or by auxilliary control means) from one position, in which it engages with the drive face and is rotated in one sense of direction, radially relative to the axis of the member carrying that drive face to a further position of engagement with the drive face where that member is rotated in the opposite sense of direction. For example the second member is displaceable along the second axis and if this axis is parallel to a radial line of the first axis, the second member will rotate in one direction when engaging with the first drive face on one side of the first axis and will rotate in the opposite direction when displaced along the second axis to engage with the first drive face on the other (diametrically opposite) side of the first axis.

The control means (and any auxilliary control means as referred to above) can be wholly or partly manual, mechanical, electrical and/or fluid (hydraulic or pneumatic) pressure operated. In a simple form of the gear assembly the first and/or second control means can consist of push rods connected to the second and fourth members so that such members can be displaced by manual pressure laterally relative to the first and third axes respectively. It is envisaged however that fluid pressure operated control means will usually be provided whereby the second and/or fourth members will comprise single acting piston and cylinder devices the volumes of the pressure chambers for which are varied against spring or other biasing by variations in fluid pressure supplied thereto (from one or more external sources) to effect appropriate displacement of the second and/or fourth members.

The gear assembly as above described was primarily developed for use in a vehicle transmission system and there is further provided a vehicle transmission system which comprises a variable ratio gear assembly in accordance with the present invention; an engine having a rotatable drive output shaft which is coupled to the first member of the gear assembly and an output shaft of the gear assembly which is coupled to be driven by rotation of the third member (possibly through the previously discussed fourth and fifth members), said output shaft being intended to drive ground engaging drive means of the vehicle.

In such a vehicle transmission system the first and/or second control means for effecting displacement of the second and/or fourth members is preferably automatically responsive to fluid pressure variations which are derived from operation of the engine or from means driven by the engine. For example the fluid pressure variations can be derived from a fluid pump driven directly by the engine and/or from a transmission system which is driven through a gear from the engine (for example from the output shaft of the gear assembly) so that displacement of the second and/or fourth members is responsive to engine speed and/or to vehicle speed. Alternatively, or in addition, fluid pressure variations can be derived by variations in low pressure or vacuum which are developed in a manifold inlet that may be provided on the engine.

Embodiments of the present invention will now be described, by way of example only, with reference to the accompanying illustrative drawings, in which.

Figure 1:
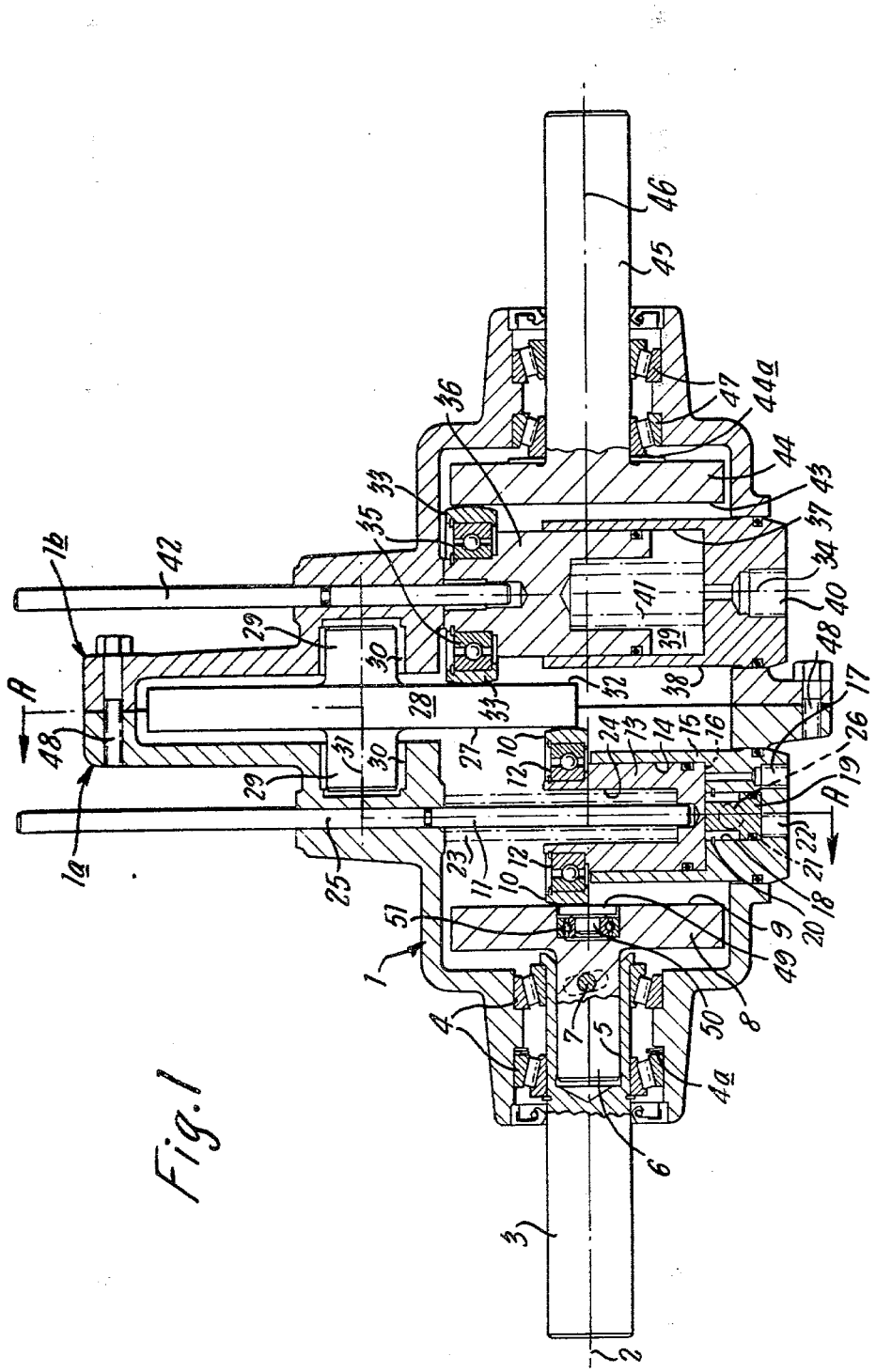
FIG. 1 is a section through a gear assembly constructed in accordance with the present invention.
Figure 5:
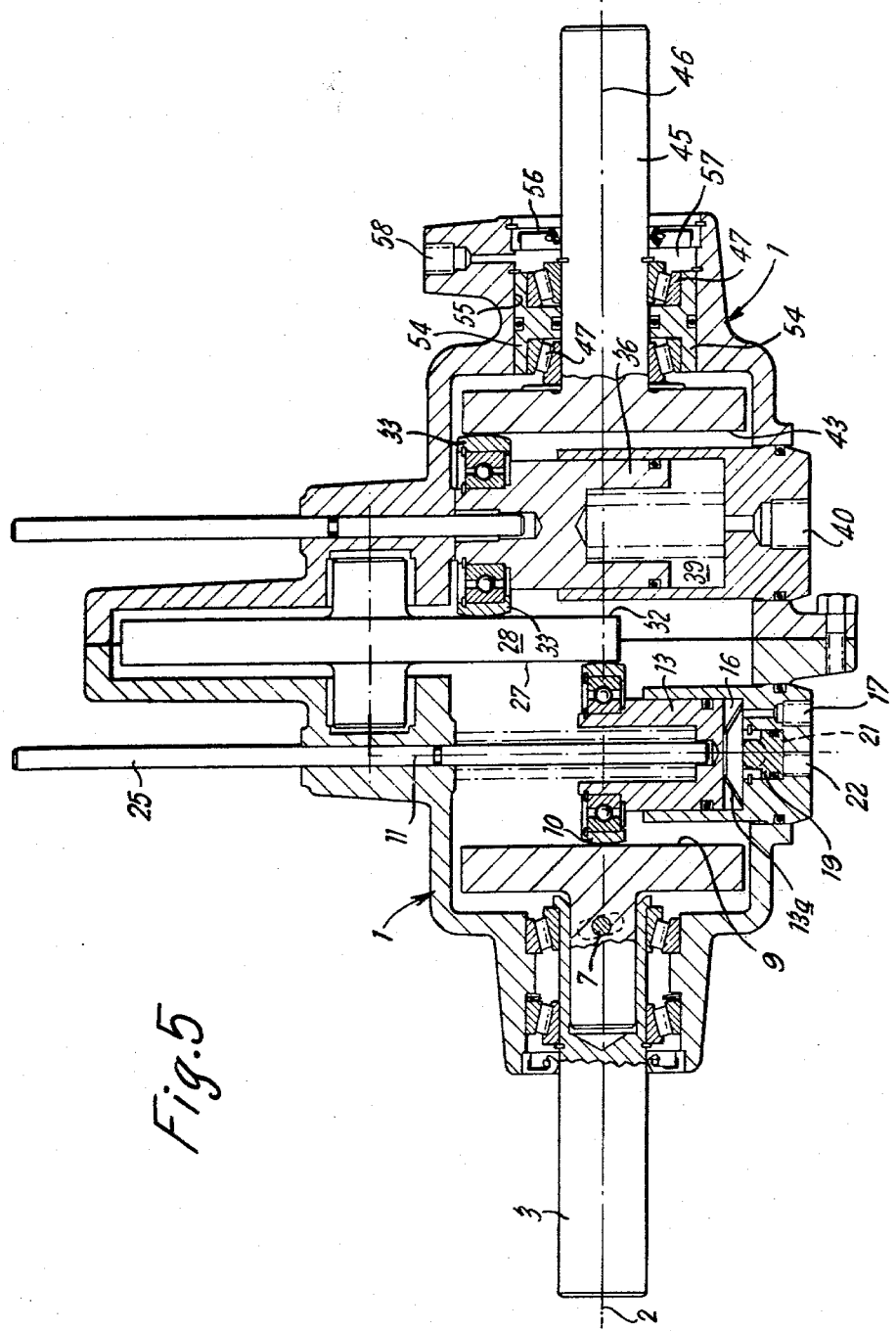
FIG. 5 is a section similar to that in FIG. 1 of a further embodiment of gear assembly constructed in accordance with the present invention and which gear includes a reversing facility.

FIG. 6 diagrammatically illustrates a vehicle transmission system constructed in accordance with the present invention and which includes the gear assembly of FIG. 1 or FIG. 5, and FIG. 6A illustrates a control valve incorporated in the system of FIG. 6.

Where possible throughout the following description the same parts or members as referred to in each of the Figures have been accorded the same references.

Figure 2:
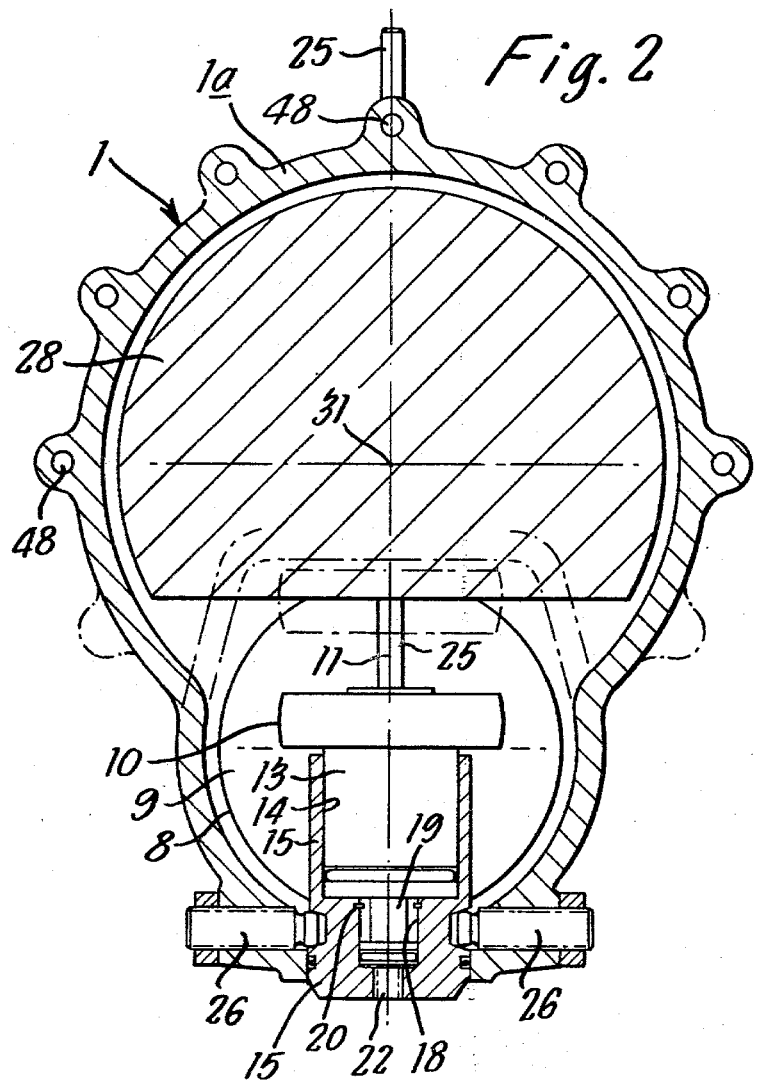
FIG. 2 is a section taken on the line A—A of the gear assembly in FIG. 1.

In the embodiment shown in FIGS. 1 and 2 the gear assembly has a housing 1 within which housing is an input shaft 3 having an axis of rotation 2. The shaft 3 is rotatably mounted in the housing 1 by inclined roller bearings 4 which co-operate between the shaft and the housing to restrain relative axial movement between the shaft 3 and the housing. It will be noted that a spring washer 4a is located between an outer race of a bearing 4 and a rebate of the housing so that the bearings may be pre-loaded the correct amount.

One end of the shaft 3 extends from the housing 1 for connection to a rotatable drive and the other, inner, end of the shaft has a blind bore 5 which receives a cylindrical spigot 6 co-axial with the shaft 3. The spigot 6 is coupled to the shaft 3 by a pin and slot arrangement 7 so that the spigot is capable of restricted rotation relative to the shaft 3 and during such rotation in one sense of direction the spigot is displaced axially relative to the shaft 3 in one direction and during relative rotation between the spigot and shaft in the opposite direction the spigot is displaced axially relative to the shaft 3 in the opposite direction.

The spigot 6 is an integral part of a flange member 8 having a flat annular drive face 9 which is co-axial with the axis 2 and extends perpendicularly relative to that axis.

Capable of abutting the drive face 9 is an annular roller 10 which is mounted for rotation about an axis 11 extending substantially perpendicularly and radially relative to the axis 2. The roller 10 is rotatably mounted by a ball bearing 12 on a piston 13 slidably mounted in a cylinder 14 of a cylindrical piston housing 15. A piston chamber 16 is formed between the piston 13 and its cylinder and communicating with this chamber is a fluid pressure port 17. Also communicating with the piston chamber 16 is a secondary piston cylinder 18 which is co-axial with the cylinder 14 and axially slidable within which is a secondary piston 19. The secondary piston 19 is capable of restricted axial displacement in its cylinder 18 to enter the piston chamber 16 and abut the piston 13. An annular flange or clip 20 is provided in the wall of the cylinder 18 to retain the secondary piston 19. The secondary piston 19 forms with its cylinder a secondary piston chamber 21 communicating with which is a fluid port 22. The piston and cylinder devices 13, 14 and 18,19 are single acting and the piston 13 is biased by a spring 23 in a sense to contract the pressure chamber 16 and, when the piston 13 is in abutment with the secondary piston 19, to contract the pressure chamber 21. The spring 23 is located in a blind bore 24 of the piston 13 and reacts against the wall of the housing 1. Extending through the spring 23 is a piston rod 25 which communicates at one end with the piston 13 while its other end projects from the housing 1 in slidably sealed manner so that the piston rod 25 is displacable along the axis 11 in unison with the piston 13. The piston rod 25 provides a convenient means for axially displacing the piston 13 manually.

The piston housing 15 is mounted in an aperture in the wall of the housing 1 and is retained relative to the housing 1 against displacement in the direction of axis 11 by a pair of pivot pins 26 (see FIG. 2). The piston housing 15 is sealed with respect to the housing 1 but is mounted by the pins 26 to be capable of restricted pivotal movement substantially in a plane which includes the axes 2 and 11.

Diametrically opposed to the position of its abutment with the drive face 9, the roller 10 abuts a second drive face 27 formed by a flat side face of an annular disc 28 having shafts 29 which are integral and co-axial therewith and by which the disc 20 is mounted through needle rollers 30 in the housing 1 for rotation about an axis 31. The drive face 27 extends perpendicularly relative to the axis 31 which latter axis is parallel with the axis 2.

The annular side face of the disc 28 which is axially opposite to the face 27 provides a third drive face 32 which is parallel with face 27. In abutment with the face 32 is a second annular roller 33 which is mounted for rotation about an axis 34. The axis 34 extends substantially perpendicularly relative to the axis 31 and is substantially parallel with the axis 11 associated with the first roller 10. The roller 33, similarly to the roller 10, is rotatably mounted through a ball bearing 35 on a piston 36 which is slidable in the direction of the axis 34 in a cylinder 37 of a cylindrical piston housing 38. The piston housing 38 is mounted in an aperture in the wall of the housing 1 in sealed manner and is retained relative to the housing 1 against displacement in the direction of axis 34 by a pair of pivot pins (not shown) similarly to the piston housing 15. The piston housing 38 is sealed with respect to the housing 1 but is mounted by the pins associated therewith to be capable of restricted pivotal movement substantially in a plane which includes the axes 31 and 34. Formed between the piston 36 and its cylinder 37 is a variable pressure chamber 39 communicating with which is a fluid port 40. The piston 36 and cylinder 37 form a single acting device which, in the present embodiment, is intended to be operated by a reduction in air pressure or a vacuum applied to the chamber 39; consequently the chamber 39 is biased by a spring 41 to an expanded condition in which the piston 36 abuts the wall of housing 1. Similarly to the piston 13, the piston 36 has connected thereto a piston rod 42 which projects in sealed manner through the wall of the housing 1 to slide in unison with the piston and provides a convenient means for manually displacing the piston in its cylinder 37.

At a position diametrically opposed to the position of engagement between the roller 33 and drive face 32, the roller 33 abuts a fourth drive face 43 formed by a circular end face on a flange 44 of an output shaft 45 which projects from the housing 1. The shaft 45 is mounted for rotation about an axis 46 which is co-axial with the axis 2 and the drive face 43 is flat and extends perpendicularly relative to the axis 46. The shaft 45 is rotatably mounted in the housing 1 by inclined roller bearings 47 and is also mounted by the bearings 47 to be capable of limited displacement (relative to the housing 1) in the direction of its axis 46. The bearings 47 are restrained from axial movement relative to the housing 1 and reacting between the flange 44 and the inner race of the bearing 47 adjacent to that flange is a spring or Bellville washer 44a. The spring washer 44a biases the flange 44 and thereby the shaft 45 leftwardly in FIG. 1 in the direction of axis 46 to urge the drive face 43 into driving engagement with the roller 33.

It will be noted that (see FIG. 1) the housing 1 is constructed from two substantially identical casing parts 1a and 1b which are secured together by a peripherally spaced array of bolts 48.

Associated with the first drive face 9 is a non-driving region 49 formed by a circular flat face of a rotor 50. The circular flat face 49 is located centrally of and is coplanar with the drive face 9 and the rotor 50 is freely mounted for co-axial rotation relative to the flange member 8 within which it is housed by a ball bearing 51. When the piston chamber 16 is in its fully contracted condition (which may be regarded as a neutral condition of the gear as shown in FIG. 1) the roller 10 abuts the non-driving region 49 and in this condition the roller 10 also abuts the marginal outer edge portion of the drive face 27. Also in the neutral condition of the gear the roller 33 abuts the drive face 32 at a position radially inwardly of the roller 10 with respect to the axis 31.

The interior of the housing 1 is filled with a traction fluid such as a cycloaliphatic synthetic hydrocarbon fluid, for example, that made by Monsanto Limited and sold under the trade name "Santotrac", which is a fluid found suitable for oil film drives.

If the shaft 3 is rotatably driven, for example by a vehicle engine, the flange member 8 is driven in unison therewith through the pin and slot arrangement 7. If however the gear is in its neutral condition with the roller 10 abutting face 49 the latter rotates freely within the drive face 9 with the effect that no drive is transmitted to the roller 10 and through the gear assembly. The pin and slot arrangement 7 in FIG. 1, as previously mentioned, is arranged to axially displace the flange member 8 relative to the shaft 3 and the slot is inclined relative to the axis 2 in the direction which ensures that when the shaft 3 is rotated the face 49 and the drive face 9 is urged into abutment with the roller 10 against the biasing effect of the spring washer 44a.

If, while the shaft 3 is rotating, the piston 13 is displaced axially from the neutral condition as drawn so that the roller 10 moves into engagement with the drive face 9, an oil film drive is imparted from the drive face 9 to the roller 10 causing the latter to rotate about axis 11. Oil film engagement between the roller 10 and the drive face 27 causes the disc 28 to rotate about axis 31 and this drive is further transmitted through the gear by oil film engagement between roller 33 and drive face 32 which causes the roller 33 to rotate about axis 34 and oil film engagement between the roller 33 and the drive face 43 which causes the output shaft 45 to rotate about axis 46. It will be apparent that as the roller 10 is progressively displaced to a greater radius with respect to axis 2 the rotational speed of the roller progressively increases to drive the disc 28; however during such displacement of the roller 10 the position of its engagement with the drive face 27 decreases radially with respect to the axis 31. This latter displacement has the effect that as the roller 10 is displaced along the axis 11 from the position shown in FIG. 1 to a position in which it is in alignment with the roller 33 the gear ratio in transmission from the roller 10 through the disc 38 to the roller 33 progressively increases to a 1:1 ratio. The roller 33 is also capable of displacement along the axis 34 to vary the radius (with respect to the axis 31) at which that roller engages the drive face 32; consequently by displacement of the pistons 13 and 36 to vary the position of engagement of their respective rollers with their drive faces 27 and 32 an infinitely variable gear ratio between predetermined limits is achieved, such gear ratio being less than one when the roller 10 is at a greater radius with respect to the axis 31 than is the roller 33, being one to one as aforementioned when the rollers 10 and 33 are in alignment (on an axis parallel to the axis 31) and being greater than one when the roller 33 is at a greater radius with respect to the axis 31 than is the roller 10. Furthermore, as the roller 33 is displaced radially progressively further from the axis 31, the radius of the contact circle between the roller 33 and the drive face 43 progressively decreases so that this provides a progressively increasing gear ratio (or decreasing mechanical advantage) to the drive which is transmitted to the output shaft 45.

During rotation of the input shaft 3 the drive face 9 is urged axially into abutment with the roller 10 as aforementioned and the force of such abutment can effect in slight pivotal movement of the piston housing 15 about pins 26 to urge the roller 10 into abutment with the drive face 27 and thereby maintain efficient frictional engagement. If required, the disc 28 can be mounted in the housing 1 to be capable of slight axial movement in the direction of the axis 2 so that the force exerted by axial displacement of the drive face 9 towards the drive face 43 can urge both rollers 10 and 33 into abutment with their respectively associated drive faces 9, 27, 32 and 43 to provide efficient oil film drive engagement.

Displacement of the rollers 10 and 33 along their respective axes 11 and 34 can be achieved manually by use of the piston rods 25 and 42 but in the present embodiment the primary means for displacing the rollers is intended to be provided by fluid pressure variations in the chambers 16, 21 and 39. The displacement of piston 13 and thereby roller 10 can be responsive to variations from two separate fluid pressure sources one (such as is provided by an engine-driven pump) acting in the chamber 21 and the other (such as is provided by a transmission driven pump) in the chamber 16 whereas the piston 36 is responsive to variations in fluid pressure from a single source (or sink) such as a vacuum source provided by an engine inlet manifold. By the arrangement of the secondary piston 19 and the pressure chambers 16 and 21 associated with the piston housing 15 it will be seen that the piston 19 when fully displaced by maximum expansion of the chamber 21 is capable only of displacing the piston 13 (and thereby the roller 10) part way along the full stroke of the piston 13 whereas the expansion of the chamber 16 is capable of displacing the piston 13 over its full stroke from the position shown in FIG. 1 to a position in which the piston abuts against the wall of the housing 1.

Figure 3:
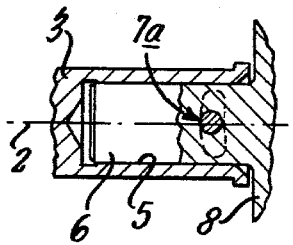
FIGS. 3 and 4 illustrate alternative forms of biasing arrangements capable of being incorporated in the assembly of FIG. 1.
Figure 4:
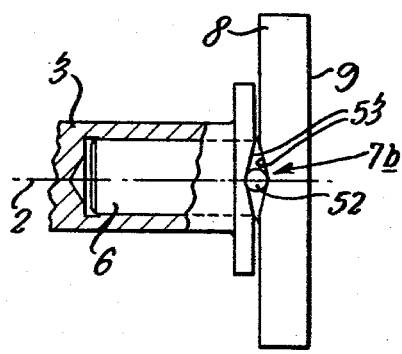

The pin and slot arrangment 7 in FIG. 1 is single acting in the sense that it will only displace the drive face 9 into abutment with the roller 10 in one direction of rotation of the shaft 3 and it is possible that when the shaft 3 is stationary the drive face 9 will move slightly out of contact with the roller 10. Consequently the drive arrangement in FIG. 1 is not intended to be reversible although of course a reversible gear (not shown) can be driven by the output shaft 46. If required however the pin and slot connection 7 in FIG. 1 can be replaced by a double acting connection between the shaft 3 and flange member 8 and arrangements of such double acting connections are shown in FIGS. 3 and 4. In FIG. 3 the double acting connection is shown at 7a and again is of a pin and slot form which couples together the shaft 3 and the spigot 6 but in this modification the slot has a cam shape of substantially "boomerang" profile so that irrespective of the direction in which the shank 3 is rotated, the pin will ride up the slot to displace the drive face 9 along the axis 2 into closer frictional engagement with the roller 10. In the modification of FIG. 4 the double acting connection between the shaft 3 and the flange member 8 is shown at 7b and comprises one or more rollers or balls 52 engaging with cam surfaces 53 carried by the shaft 3 and flange member 8. The cam surfaces 53 are opposed in the direction of the axis 2 and are inclined relative to each other so that irrespective of the direction in which the shaft 3 is rotated there will be relative displacement between the balls or rollers 52 and the surfaces 53 causing the drive face 9 to be urged axially into closer frictional engagement with the roller 10. By modifying the gear assembly as shown in FIG. 1 to incorporate a double acting connection between the input shaft 3 and the flange member 3 (such as either of the arrangements shown in FIG. 3 or FIG. 4) it will be apparent that the input shaft can be driven from a reversible gear component and so the direction of drive for the output shaft 45 is reversible. It is also to be realised however that the flange member 8 can be rigidly connected to or integral with the input shaft 3 in such constructions where the input shaft is mounted to maintain effective oil film drive engagement between the drive face 9 and the roller 10 or is displaceable as a whole to provide such drive engagement as is necessary.

The gear assembly as above described with reference to FIGS. 1 and 2 does not, in itself, provide the facility for reversing the direction of drive between the input and output shafts 3 and 45 but such facility is provided in the embodiment of gear assembly as shown in FIG. 5. The gear assembly in FIG. 5 is similar in the majority of respects to that previously discussed but it will be noted in particular that the radius of the disc 28 is greater than the corresponding disc in the FIG. 1 embodiment and that the roller 10 is capable of being displaced along the axis 11 diametrically over the drive face 9 from a first position located on one side of the axis 2 to a second position in which it is located on the diametrically opposite side of the axis 2 (which second position corresponds to the permissible variations in displacement of the roller 10 as discussed with reference to FIG. 1). In the embodiment of FIG. 5 the non-driving region provided by the face 49 has been omitted and when the roller 10 engages the drive face 9 in the aforementioned first position (that is, say, below the axis 2 in FIG. 5) that roller will be rotated about the axis 11 in one sense of direction and when the roller 10 engages the drive face 9 in the aforementioned second position (that is above the axis 2 in FIG. 5) that roller will be rotated in the opposite sense of direction about the axis 11—assuming in both cases that the input shaft 3 is rotated in the same sense of direction. Consequently by appropriate displacement of the piston 13 to move the roller 10 into engagement with the drive face 9 at a position above and below the axis 2 in FIG. 5 the drive through the disc 28, roller 33 and output shaft 45 is reversible.

A further feature incorporated in the embodiment of FIG. 5 is the manner in which the output shaft 45 is displaceable along the axis 46 with respect to the housing 1. This is achieved by mounting the bearings 47 in an annular carriage 54 which carriage is secured axially with respect to the shaft 45. The carriage 54 is capable of restricted axial sliding movement in a complementary bore 55 in the housing 1. The bore 55 is closed by a plug 56 and formed between this plug and the bearing assembly constituted by the carriage 54 and roller bearings 47 is a pressure chamber 57 which can communicate with a fluid pressure source through a port 58. Usually the shaft 45 and its bearing assembly will be incorporated in the gear assembly so that the drive face 43 is in engagement with the roller 33. However, bearing in mind that the shaft 45 is displaceable in the direction of its axis 46, the drive face 43 can move out of contact with the roller 33, indeed the shaft 45 may have auxilliary control means associated therewith or even be spring biased to move the drive face 43 out of driving engagement with the roller 43. This latter feature may be desirable bearing in mind that the drive face 9 does not have associated therewith a non-driving region and so drive may be transmitted through the gear assembly for so long as the shaft 3 is rotating and the drive face 43 is in driving engagement with the roller 33. To provide this latter engagement and also a means of taking-up the drive and/or of maintaining efficient engagement between the roller 33 and face 43 fluid pressure can be applied to the chamber 57 through port 58. This fluid pressure has the effect of displacing the carriage 54, bearings 47 and shaft 45 along the axis 46 in piston-like manner to effect and/or maintain driving engagement.

FIG. 6 diagrammatically illustrates a vehicle transmission system which incorporates a gear assembly in accordance with one of the previously described embodiments, such gear assembly being illustrated generally at 59. In FIG. 6 an internal combustion engine 60 is coupled to drive the input shaft 3 and a take-off 61 from this shaft drives an hydraulic pump 62 drawing fluid from a reservoir 63. The output from the pump 62 varies in proportion with engine speed and this output passes by way of conduit 64 to the port 22 which feeds the pressure chamber 21 of the secondary piston 19. The engine 60 has an inlet manifold 65 which provides variations in low pressure or vacuum and this connects by way of a conduit 66 with the port 40 and therethrough with chamber 39. The output shaft 45 of the gear assembly 59 is coupled at 67 to drive an hydraulic pump 68 which draws fluid from a reservoir 69. The output from pump 68 varies in proportion with the speed of rotation of the shaft 45 and this output passes by way of a conduit 71, a control valve 70 and conduit 71a to the inlet port 17 feeding pressure chamber 16 of piston 13.

The control valve 70 is shown in greater detail in FIG. 6A and comprises a spool 72 axially slidable in a spool cylinder 73 formed by a spool housing 74. The spool has two axially spaced lands between which is formed a spool transfer chamber 75 which is in constant communication with the conduits 71 and 71a communicating between the pressure chamber 16 and the pump 68. Formed between a rebate in one end of the spool 72 and the opposing end of the spool cylinder 73 is a spool pressure chamber 76 which is in constant communication with a conduit 77. As shown in FIG. 6, the conduit 77 communicates with an hydraulic braking system for the vehicle which braking system may be of conventional type having a master brake cylinder 78 actuated by a pedal 79. The spool 72 is biased in its cylinder by a spring 80 so that the spool normally abuts against the end of its cylinder where the chamber 76 is at a minimum volume. In this latter condition of the spool, a land thereof closes a port to a conduit 81 which communicates with the reservoir 69. The control valve 70 is arranged so that when the chamber 76 is pressurised and the spool 72 is displaced axially against its spring biasing from the position shown in FIG. 6A, the conduit 81 will open to communication with chamber 75 and thereby to communication with conduits 71 and 71a. Pressurisation of the chamber 76 will occur automatically to progressively displace the spool 72 as hydraulic pressure increases in the braking system to actuate the vehicle brakes upon operation of the pedal 79.

The output shaft 45 in the transmission system of FIG. 6 will, in a conventional vehicle be coupled to drive ground engaging wheels and so the fluid pressure variations in the piston chambers 16, 21 and 39 will therefore occur in response to engine speed and vehicle speed so that the transmission ratio through the the gear assembly 59 can be related to vehicle speed as sensed by the output from the pump 68.

By the arrangement shown in FIG. 6, when the input shaft 3 is rotatably driven by the engine 60 the pump 62 is operated to pressurise chamber 21 and thereby displace the secondary piston 19 and thereby the piston 13 and roller 10 to progressively increase the gear ratio as the engine speed increases until the piston 19 abuts stop 20. In addition, as the vehicle speed increases so does the output from the pump 68 and thereby the pressure in the piston chamber 16 increases to displace or further displace the piston 13 from its cylinder to a maximum extent where that piston abuts against the wall of the housing 1 to increase the gear ratio accordingly.

Upon throttling back or closing the engine throttle, there will be a corresponding decrease in pressure or vacuum effect provided in the engine induction manifold 65 which reacts through the conduit 66 in the piston chamber 39 to displace the piston 36 downwardly in FIG. 1 or 5 and so further vary (increase) the ratio which is transmitted through the gear assembly.

By incorporating the double acting coupling 7a or 7b in the gear assembly 59 the torque of the engine 60 can be utilised to assist in braking of the veupon a decrease in speed of the shaft 3 since the engagement between the roller 10 and drive face 9 will cause the double acting coupling to reverse, and the driven vehicle wheels to react against the engine torque.

The control valve 70 which is associated with both the transmission system and the braking system will serve to provide braking of the vehicle in addition to the braking system. Upon actuation of the brakes the spool 72 is displaced against its spring biasing to open communication between conduits 81, 71 and 71a as aforementioned. Consequently, the output from pump 68 will pass directly to the reservoir 69 and piston chamber 16 is also open to communication by way of chamber 75 and conduit 81 with the reservoir 69; therefore hydraulic fluid pressure in the chamber 16 is relieved and the piston 13 can (unless resisted by the secondary piston 19) be displaced by the spring 23 downwardly in FIG. 1 to decrease the gear ratio so that the engine torque is used in addition to the braking system to brake the vehicle. The manner and operation of the control valve 70 with the associated transmission and braking system is the subject of U.S. Ser. No. 22,642, filed Mar. 21, 1979.

The transmission system as above described and illustrated can be modified in many respects. For example, the pump 68 can be driven from the input side of the gear assembly; the piston 36 can be arranged to be displaced in response to hydraulic fluid pressure variations which result from a further pump driven from either the input or output side of the gear assembly. If the transmission system incorporates the assembly shown in FIG. 5 fluid pressure to the chamber 57 controlling take up of the drive from the roller 53 can be derived from an engine driven pump (possibly the pump 62) under control of an appropriate valve mechanism. Furthermore the reversible facility provided by the assembly in FIG. 5 can be manually controlled by operation of the piston rod 25; by this arrangement variation in the forward gear ratio of the vehicle will be achieved by variations in fluid pressure in the chambers 16 and 21 which, in FIG. 5, are used to displace the roller 10 over the drive face 9 radially above the axis 2 whereas when reverse gear is required, the piston 13 can be displaced manually by the piston rod 25 downwardly from the position shown in FIG. 5 (possibly against spring loading 13a) so that the roller 10 engages with the drive face 9 at a position below the axis 2.

Although the pumps 62 and 68 are indicated in FIG. 6 as external components of the gear assembly, one or more of such pumps can be "built-in" with the gear assembly or located internally of the gear housing, possibly utilising lubrication fluid within the gear assembly.

I claim:

1. A variable ratio gear assembly comprising:
a first member having a first axis about which the first member is intended to be rotatably driven, said member having a drive face which extends laterally relative to said first axis;
a second member having a second axis which extends laterally relative to the first axis and about which second axis the second member is intended to be rotatably driven, said second member engaging or being capable of engaging said drive face so that, when one of said members is rotatably driven about its axis, rotation is imparted to the other member by oil film or traction drive; and
control means for displacing one of the members relative to the other and substantially in the direction of the second axis while the second member is maintained in engagement with the drive face to vary the ratio of drive which is transmitted between the members.

2. An assembly as claimed in claim 1 in which the second member is displaceable relative to the first member and along the second axis and said second axis extends substantially radially with respect to the first axis.

3. An assembly as claimed in claim 1 and comprising a third member which is mounted for rotation about a third axis extending laterally relative to the second axis, said third member having a second drive face which extends laterally relative to the third axis and with which the second member is in oil film or traction driving engagement so that, when one of the second or third members is rotatably driven about its respective axis, rotation is imparted to the other of those members and operation of the control means displaces the second member relative to the third axis to vary the ratio of drive which is transmitted between the second and third members.

4. An assembly as claimed in claim 3 in which the first and the third axes are substantially parallel.

5. An assembly as claimed in claim 3 in which the third member is a disc a substantially flat side face of which forms the second drive face.

6. An assembly as claimed in claim 3 in which the first, second and third axes are stationary relative to each other.

7. An assembly as claimed in claim 3 and comprising a fourth member mounted for rotation about a fourth axis which extends laterally relative to the third axis, the fourth member being in oil film or traction driving engagement with a drive face of the third member which drive face extends laterally with respect to the third axis so that when one of the third of fourth members is rotatably driven about its respective axis, rotation is imparted to the other of those members, and wherein second control means is provided for displacing the third and fourth members relative to each other to vary the ratio of drive which is transmitted between the third and fourth members.

8. An assembly as claimed in claim 7 in which the second and fourth axes are in substantially parallel planes.

9. An assembly as claimed in claim 7 in which the drive face of the third member with which the fourth member engages is the second drive face.

10. An assembly as claimed in claim 7 in which the third member is located between the second and fourth members and the fourth member engages with a third drive face of the third member which third drive face is directed outwardly of the third member in the axially opposite direction (with respect to the third axis) to the second drive face.

11. An assembly as claimed in claim 7 and comprising a fifth member mounted for rotation about a fifth axis which extends laterally with respect to the fourth axis, the fifth member having a fourth drive face which extends laterally relative to the fifth axis; and wherein the fourth member drivingly engages or is capable of engaging by oil film or traction drive the fourth drive face so that, when one of the fourth and fifth members is rotatably driven about its respective axis, rotation is imparted to the other of those members and operation of the second control means displaces the fourth member relative to the fifth axis to vary the ratio of drive which is transmitted between the fourth and fifth members.

12. An assembly as claimed in claim 11 in which the first, third and fifth axes are substantially parallel.

13. An assembly as claimed in claim 11 in which the first and the fifth axes are substantially in alignment.

14. An assembly as claimed in claim 11 in which the second axis extends substantially radially of the first axis and the fourth axis extends substantially radially of the fifth axis.

15. An assembly as claimed in claim 1 in which biasing means is provided for urging at least two of the members into driving engagement with each other.

16. An assembly as claimed in claim 15 in which the biasing means is responsive to the speed of rotation of one of the members.

17. An assembly as claimed in claim 16 in which the biasing means comprises a cam device actuated by rotation of a member so that as that member is rotatably driven it is displaced by the cam device along its axis to urge that member into close driving engagement with the other member with which it co-operates.

18. An assembly as claimed in claim 17 in which the cam device comprises a pin and slot mechanism incorporated between two relatively rotatable components of a member whereby as one of those components is rotated during rotation of that member the cam device reacts to impart displacement between the two components in the direction of the axis of that member to provide the biasing.

19. An assembly as claimed in claim 17 in which the cam device comprises a co-operating ball and cam surface mechanism incorporated between two relatively rotatable components of a member whereby as one of those components is rotated during rotation of that member the cam device reacts to impart displacement between the two components in the direction of the axis of that member to provide the biasing.

20. An assembly as claimed in claim 15 in which the biasing means is responsive to rotation of the first member and reacts to displace the first drive face of that member along the first axis and into driving engagement with the second member.

21. An assembly as claimed in claim 3 in which the first and second drive faces are located oppositely to each other and the second member is located between said first and second drive faces and biasing means is provided for urging the first drive face into engagement with the second member, and wherein the second member is pivotally mounted in a housing of the assembly so that the second member is pivoted by the biasing force exerted thereon from the first member to be urged into closer engagement with the second drive face of the third member.

22. An assembly as claimed in claim 7 in which the fourth member is pivotally mounted in a housing of the assembly and biasing means is provided which imparts pivotal movement to the fourth member to urge it into closer engagement with a drive face with which that fourth member engages.

23. An assembly as claimed in claim 11 in which the third and fourth drive faces are located oppositely to each other and the fourth drive member is positioned between those third and fourth drive faces and wherein biasing means is provided which reacts to displace the fourth drive face along the fifth axis and urge the fourth member into close driving engagement with the third and fifth members.

24. An assembly as claimed in claim 11 in which the fifth member is displaceably mounted for movement in the direction of the fifth axis into and out of driving engagement with the fourth member.

25. An assembly as claimed in claim 1 in which the drive face has associated therewith a non-driving region and the member which drivingly engages with the drive face having the associated non-driving region is relatively displaceable from that drive face into engagement with the non-driving region which latter engagement prevents drive from being transmitted.

26. An assembly as claimed in claim 24 in which the non-driving region comprises a face of a rotor which is freely rotatably carried by the member having the drive face with which it is associated.

27. An assembly as claimed in claim 1 in which the control means comprises a single acting piston and cylinder device the volume of the variable chamber for which is varied against a biasing force by fluid pressure variations in that chamber to effect displacement of the member with which that control means is associated.

28. An assembly as claimed in claim 21 in which the second member is displaceable along the second axis by actuation of a piston and cylinder device and wherein said second member is carried by one of the piston and the cylinder components of the device and the other component is pivotally mounted on the housing.

29. An assembly as claimed in claim 1 and which provides transmission of drive in forward and reverse senses and in which the drive face is intended to be rotated in one sense of direction and the member which engages with that drive face is displaceable by control means associated therewith from one position, in which it engages with the drive face and is rotated in one sense of direction, radially relative to the axis of the member which carries that drive face to a further position of engagement with the drive face where that member is rotated in the opposite sense of direction.

30. A vehicle transmission system which comprises a variable ratio gear assembly as claimed in claim 1; an engine having a rotatable drive output shaft which is coupled to the first member of the gear assembly, and an output shaft of the gear assembly which is coupled to be driven by rotation of the third member, said output shaft being intended to drive ground engaging drive means of the vehicle.

31. A system as claimed in claim 30 in which the control means of the gear assembly is automatically responsive to fluid pressure variations which are derived from operation of the engine or from means driven by the engine.

32. A system as claimed in claim 31 in which the fluid pressure variations are derived from a fluid pump driven by the engine so that displacement of the member on which the control means reacts is responsive to engine speed.

33. A system as claimed in claim 31 in which the fluid pressure variations are derived from a fluid pump driven by a transmission system which is driven through a gear from the engine so that displacement of the member on which the control means reacts is responsive to vehicle speed.

34. A system as claimed in claim 31 in which the fluid pressure variations are derived from variations in low pressure or vacuum which are developed in a manifold inlet provided on the engine.

* * * * *